Sept. 13, 1932.  G. MERKLIN  1,877,005

WHEEL CLEANING ATTACHMENT FOR TRACTORS

Filed Feb. 6, 1931  2 Sheets-Sheet 1

Inventor

George Merklin

By Clarence A O'Brien
Attorney

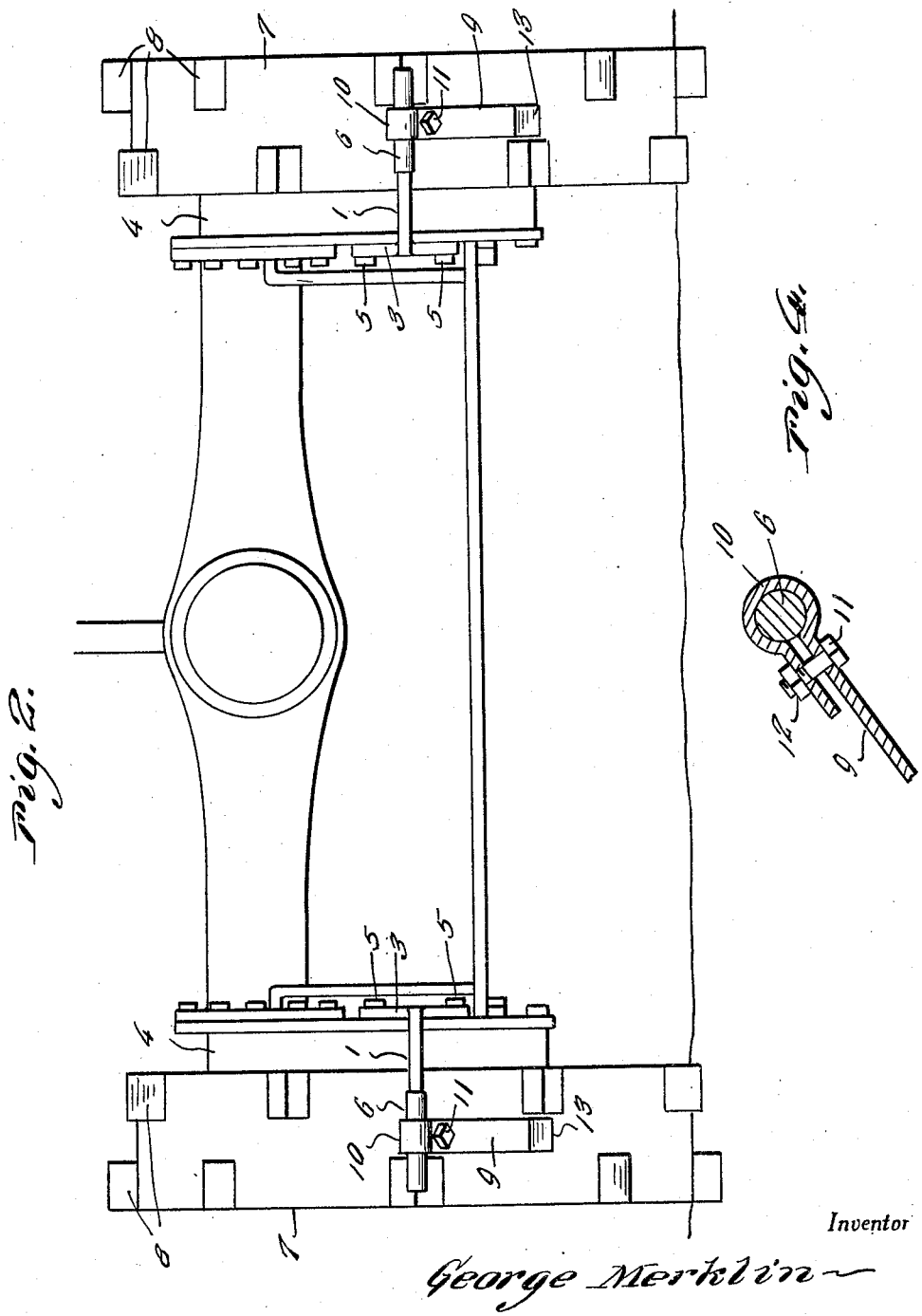

Patented Sept. 13, 1932

1,877,005

UNITED STATES PATENT OFFICE

GEORGE MERKLIN, OF BONILLA, SOUTH DAKOTA

WHEEL CLEANING ATTACHMENT FOR TRACTORS

Application filed February 6, 1931. Serial No. 514,039.

The present invention pertains to a wheel cleaning attachment for tractors and has for one of its important objects to provide, in a manner as hereinafter set forth, a device of this character embodying a novel construction and arrangement of parts whereby the same may be expeditiously mounted in position for use on the tractor without the necessity of materially altering the tractor structurally and without requiring special tools or skilled labor.

Another important object of the invention is to provide a wheel cleaning attachment for tractors of the aforementioned character embodying a pair of scrapers which may be adjusted expeditiously relative to the periphery of the wheels and wherein the device will not be in the way when mounted in position on the tractor.

Other objects of the invention are to provide a wheel cleaning attachment for tractors which will be simple in construction, strong, durable, efficient and reliable in use and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 2 is a view in rear elevation thereof.

Figure 4 is a fragmentary detail view in longitudinal section showing the means for clamping the scrapers on their supporting brackets.

Figure 1:
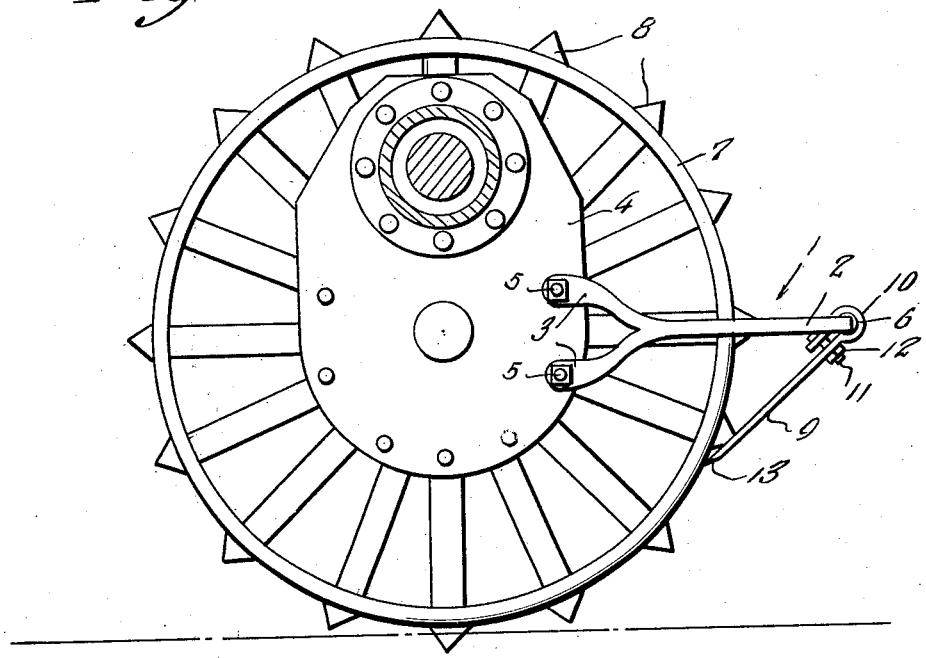
Figure 1 is a view in side elevation of a wheel cleaning attachment in accordance with this invention showing the same mounted in position for use.
Figure 3:
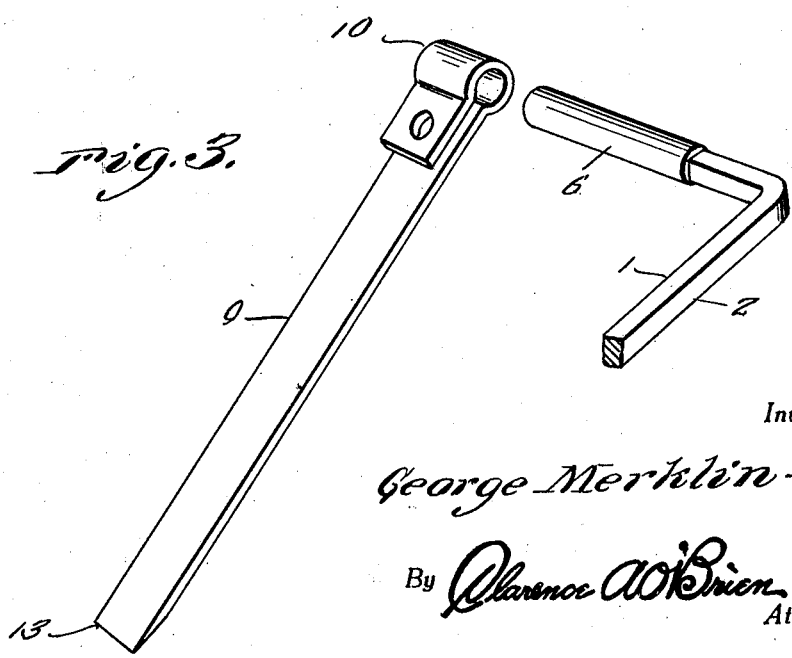
Figure 3 is a fragmentary view in perspective showing one of the scrapers and a portion of the supporting bracket therefor.

Referring to the drawings in detail, it will be seen that the reference numeral 1 designates a pair of angular brackets each comprising a leg 2 of polygonal cross section having furcations 3 formed integrally for disposition against the inner sides of the rear wheel gear housings 4 of the tractor. The free end portions of the furcations 3 are provided with holes for the passage of certain of the bolts 5 which secure the gear housings 4 in position. The furcations 3 have their free end portions properly spaced to receive said certain of the bolts 5.

Each of the brackets 1 further includes a horizontally disposed outwardly directed arm 6 of circular cross section which arms 6 are disposed in rearwardly spaced relation to the peripheries of the adjacent wheels 7 of the tractor. The reference numeral 8 designates the usual spaced, staggered lugs on the tractor wheels 7.

The reference numeral 9 designates a pair of elongated scrapers having clamping loops 10 formed integrally with one end for the reception of the arms 6 of the brackets 1. The clamping loops 10 are contracted to grip the arms 6 through the medium of the bolts 11 having the nuts 12 threaded thereon. This is illustrated to advantage in Figure 4 of the drawings. The free ends of the scrapers 9 are sharpened to provide scraping edges 13.

It will thus be seen that the scrapers 9 are mounted on the supporting brackets 1 in a manner to permit the same to be expeditiously adjusted laterally on and about the arms 6 to project the scrapers toward the wheels 7 in vertical planes between the circumferentially arranged rows of lugs 8. It will thus be seen that the lugs 8 on the wheels will pass on the opposite sides of the free end portions of the scrapers 9. It will further be seen that the clamping loops 10 will permit swinging adjustment of the scrapers 9 on the brackets 1 to expeditiously regulate the positions of the scraping edges 13 with respect to the peripheries of the wheels 7.

From a consideration of Figure 2 of the drawings it will be further apparent that the scraping devices comprised in this invention will not be in the way in a manner to interfere with the functioning of the tractor and this constitutes an important feature of the invention. Still another important feature of the invention resides in the interchangeability of the parts, the brackets 1 and the scrapers being adapted for use on either side of the tractor.

Manifestly my improvement is designed especially for use on the type of tractors having gear housings, as 4, at the inner sides of the ground wheels, and for cooperation with ground wheels each of which is equipped with spaced circumferential sets of ground engaging lugs, it being important to dispose the scraping blades in vertical planes in line with the spaces between the circumferential sets of lugs on the wheels, so that the scraping blades will not interfere in any measure with the lugs but will serve efficiently in clearing mud from the peripheries of the wheels and also from the inner sides of the lugs. In this connection it will be noticed that the scrapers or scraping blades are adjustable on the arms 6 in the direction of the length of said arms and also in the direction of the width of the tractor, this capacity of function being materially advantageous because it permits of the ready setting of the scrapers 9 in alignment with the spaces between the circumferential sets of lugs 8, and subsequently to the said positioning of the scrapers 9 the scrapers may be adjusted about the axes of the arms 6 for the maintenance of the free ends of the scrapers 9 in close proximity to the smooth portions of the peripheries of the wheels, at points between the two sets of lugs 8, the scrapers when accurately set in the manner described being adjustably fixed in position by tightening of the nuts 12 on the bolts 11. It will also be noticed that in accordance with my invention the scrapers 9 are not yieldingly passed against the peripheries of the wheels but merely rest and are maintained closely adjacent to said peripheries, so that not only is my improvement simple and inexpensive in construction but it is well adapted to withstand the hard usage to which tractor appurtenances are ordinarily subjected.

It is believed that the many advantages of a wheel cleaning attachment for tractors constructed in accordance with this invention will be readily understood, and although the preferred embodiment of the invention is as illustrated and described, it is to be understood that changes in the details of construction may be had which will fall within the scope of the invention as claimed.

What is claimed is:—

A tractor having ground wheels on the peripheries of each of which are spaced circumferential sets of ground engaging lugs, and also having at the inner sides of said ground wheels gear casings, and further having in combination with said ground wheels and gear casings, scraper attachments each of which comprises a bracket fixed to the inner side of and extending rearwardly from one gear casing and provided with a transverse arm of circular form in cross section, said arm resting in rear of and in spaced relation to the periphery of the adjacent wheel, and a scraper adjustable on and in the direction of the length of said arm and also adjustable about the axis of the arm and arranged with its free end in a plane between the circumferential sets of lugs on the adjacent wheel, and means complementary to the scraper for adjustably fixing the scraper against movement lengthwise of the arm and about the axis thereof.

In testimony whereof I affix my signature.

GEORGE MERKLIN.